(12) United States Patent
Sharp (10) Patent No.: US 10,513,957 B2
(45) Date of Patent: Dec. 24, 2019

(54) LIQUID CONSERVATION DEVICE FOR AN EXHAUST TREATMENT

(71) Applicant: Robert John Sharp, Camarillo, CA (US)

(72) Inventor: Robert John Sharp, Camarillo, CA (US)

( * ) Notice: Subject to any disclaimer, the term of this patent is extended or adjusted under 35 U.S.C. 154(b) by 79 days.

(21) Appl. No.: 15/691,732

(22) Filed: Aug. 30, 2017

(65) Prior Publication Data

US 2018/0128136 A1  May 10, 2018

Related U.S. Application Data (60) Provisional application No. 62/382,258, filed on Sep. 1, 2016.

(51) Int. Cl.
| | |
|---|---|
| *F01N 3/00* | (2006.01) |
| *F01N 3/02* | (2006.01) |
| *F01N 3/021* | (2006.01) |
| *F01N 13/00* | (2010.01) |
| *F01N 3/20* | (2006.01) |
| *F01N 3/04* | (2006.01) |

(52) U.S. Cl.
CPC .............. *F01N 3/005* (2013.01); *F01N 3/02* (2013.01); *F01N 3/021* (2013.01); *F01N 3/0205* (2013.01); *F01N 3/04* (2013.01); *F01N 3/2066* (2013.01); *F01N 13/004* (2013.01); *F01N 2240/02* (2013.01); *F01N 2240/22* (2013.01); *F01N 2590/02* (2013.01); *F01N 2590/08* (2013.01); *F01N 2590/10* (2013.01); *Y02A 50/2325* (2018.01); *Y02T 10/24* (2013.01)

(58) Field of Classification Search
CPC .......... F01N 3/005; F01N 3/02; F01N 3/0205; F01N 3/021; F01N 3/04; F01N 3/2066; F01N 13/004; F01N 2240/02; F01N 2240/22; F01N 2590/02; F01N 2590/08; F01N 2590/10; Y02A 50/2325; Y02T 10/24; F23J 2219/40; F23J 15/04
USPC .............................. 60/274; 165/DIG. 195, 70
See application file for complete search history.

(56) References Cited

U.S. PATENT DOCUMENTS

| | | | | |
|---|---|---|---|---|
| 4,141,702 | A * | 2/1979 | deVries | B01D 47/06 95/225 |
| 4,999,167 | A * | 3/1991 | Skelley | B01D 53/343 422/175 |
| 5,206,002 | A * | 4/1993 | Skelley | B01D 53/346 423/235 |
| 6,019,819 | A * | 2/2000 | Williams | B01D 5/0081 261/116 |
| 8,617,494 | B2 * | 12/2013 | Wang | F23J 15/04 165/913 |
| 2008/0289501 | A1 * | 11/2008 | Kapitoures | B01D 47/14 95/211 |
| 2014/0127107 | A1 * | 5/2014 | Suchak | F23J 15/04 423/235 |

(Continued)

*Primary Examiner* — Justin M Jonaitis (57) ABSTRACT

A liquid conservation device that utilizes a heat exchanger to condense water vapor from exhaust gas emanating from an exhaust treatment. Water evaporated during the emissions control process is recovered and returned for reuse, thereby significantly reducing the water requirement of the exhaust treatment. This is especially helpful for a mobile emissions control system that is normally not directly connected to a water utility.

20 Claims, 4 Drawing Sheets

(56) References Cited

U.S. PATENT DOCUMENTS

2015/0044116 A1\* 2/2015 Suchak .................... F01N 3/04
                       423/235

\* cited by examiner

LIQUID CONSERVATION DEVICE FOR AN EXHAUST TREATMENT

CROSS-REFERENCE TO RELATED APPLICATIONS

This application claims the benefit of PPA Ser. Nr. 62/382,258, filed 2016 Sep. 1 by the present inventor, which is incorporated by reference.

FEDERALLY SPONSORED RESEARCH

None.

SEQUENCE LISTING

None.

BACKGROUND

Sources of combustion create exhaust gas that contains harmful pollutants including, but not limited to, particulate matter (PM), hydrocarbons (HC), nitrogen oxides (NOx), sulfur dioxide ($SO_2$), carbon monoxide (CO), engine lubricating oil, and unburned fuel. To reduce the dangers of exhaust gas to human health, regulating agencies including the United States Environmental Protection Agency (EPA) and state agencies set maximum emission limits. Engine and boiler manufacturers and/or operators install emissions treatment systems to meet these increasingly stringent regulations. Emissions sources are categorized as either stationary sources or mobile sources.

Examples of mobile sources include, but are not limited to oceangoing vessels and locomotives. One of many examples of an emissions treatment system that travels with a mobile source is one that travels with an oceangoing vessel. Another example is an emissions treatment system that travels with locomotive(s) in railcars. An emissions treatment system for a mobile source may travel with the mobile source and/or connect to the mobile source when the mobile source is temporarily not travelling but continuing to generate emissions. Emissions treatment systems for mobile sources are more challenging due to the absence of a fixed connection to utilities such as water.

Many mobile sources that are stationary for a period of time but continue generating emissions. Thus, mobile emissions treatment systems are frequently connected to mobile sources while they are stationary. One example is a mobile emissions treatment system connected to an oceangoing vessel at berth in order to control emissions from the vessel's auxiliary generator(s) and/or boiler(s). Another example is a mobile emissions treatment system connected to a stopped or slow-moving locomotive in a railyard which continues to generate emissions. These are just some examples. Thus, mobile emissions treatment systems share many of the same challenges as emissions treatment systems that travel with mobile sources in the respect that there is no fixed connection to utilities such as water.

Emissions treatment systems that contain hot gas quenchers and/or wet scrubbers can waste thousands of gallons of water per day through evaporation. For wet scrubbers used in stationary sources, this may not be as much of an issue because there is typically a convenient and inexpensive connection to a water utility. However, emissions treatment systems for mobile sources that use wet scrubbers must carry thousands if not tens of thousands of gallons of water in order replace water lost to evaporation. Mobile sources with emissions treatment system or mobile emissions treatment system systems must store enough water on board in order to operate sufficiently long between water tank fill-ups. This can be impractical because of size of the water tanks, the weight of the water tanks, the cost of filling remote water tanks, and/or the logistical problems caused by frequent refilling of the tanks.

Typical emissions treatment systems may include the following elements that may contribute, either directly or indirectly to the evaporation of water into the exhaust gas:
  a) Exhaust filters such as a Diesel particulate filter (DPF) to reduce PM
  b) Selective catalytic reduction (SCR) to reduce gaseous emissions such as NOx
  c) Heater(s)
  d) Fans and/or blowers.
  e) Gas coolers
  f) Wet scrubbers to remove $SO_2$
  g) Electrostatic wet scrubbers to remove PM and $SO_2$
Some of these elements are described below:

Exhaust Filters

Exhaust temperatures from a source of combustion may reach a temperature of 540° C. to 650° C. Furthermore, sometimes supplemental heaters are used upstream or inside the exhaust filter or DPF in order to reach the operating temperatures required for the DPF.

One disadvantage of emissions treatment systems that use exhaust filters is their high operating temperature. When used upstream of a wet scrubber, for example, the high operating temperatures can cause a tremendous amount of water to be evaporated.

Selective Catalytic Reduction (SCR)

When an SCR is used in an emissions treatment system, they operate efficiently within an elevated temperature range which is typically between 200° C. and 315° C. In order cause the exhaust gas to be within this temperature range, heaters are sometimes used upstream of the emissions treatment system. This evaporated water is typically exhausted from the emissions treatment system and lost to the atmosphere.

One disadvantage of emissions treatment systems that use SCR's, is their elevated operating temperature. When used upstream of a wet scrubber, for example, the high operating temperatures of the SCR can cause a tremendous amount of water to be evaporated. This evaporated water is typically exhausted from the emissions treatment system and lost to the atmosphere.

Gas Coolers

Another element of some emissions treatment systems is a gas cooler. Gas coolers may take the form of hot gas quenchers or wet scrubbers, for example. Hot gas quenchers, are used to reduce the exhaust gas temperature prior to another process. These gas quenchers evaporate water which causes the exhaust gas to cool due to the latent heat of evaporation. The exhaust gas is cooled to near the water saturation temperature according to the pressure within the quencher. Another example of a gas cooler is a wet scrubber, which also cools the exhaust gas temperature through evaporation. The primary use for wet scrubbers, however, is to remove gaseous pollution such as $SO_2$. Gas coolers such as, but not limited to, hot gas quenchers and/or wet scrubbers, suffer from a number of disadvantages:
  (a) A disadvantage of gas coolers is they can cause the exhaust gas to become saturated with moisture.
  (b) Another disadvantage of gas coolers is they can evaporate a relatively large amount of water. Any water that is not evaporated in a gas quencher and/or wet scrubber is typically returned to a sump where it can be reused. In some cases, the quencher and/or scrubber operate as part of a mobile system that typically has no direct connection to a water utility. In a mobile application, the water must be stored in a large tank which must be periodically filled. If the mobile system operates apart from a water utility, then water must be transported to the location of the mobile system. The replacement of this evaporated water can therefore become expensive.

(c) Yet another disadvantage of gas coolers is the saturated gas can cause visible plumes that exit from an exhaust pipe. Plumes can cause visibility problems, which can be dangerous. Plumes also make a negative impression on observers because plumes have the appearance of smoke. Therefore, observers may falsely get the impression that pollution is being emitted from the exhaust pipe even though it may only be water vapor. This mistaken negative impression can harm the reputation of a manufacturer and/or operator of the emissions treatment system.

(d) Yet another disadvantage of gas coolers is the saturated gas can cause problems downstream in the pipe or ducting. If the gas cools as it travels through the pipe or ducting, then the moisture will likely condense into liquid water. Water can accumulate in the pipe and ducting, possibly causing blockages or even failure of the ducting structure. Furthermore, water can also be carried by the exhaust gas as droplets. Water droplets can carry through the system and possibly damage downstream equipment. Furthermore, condensed moisture can lead to corrosion in the exhaust pipe or ducting. Thus, the condensed water caused by gas coolers can cause damage to the equipment, which can be expensive and cause downtime and delays.

(e) Yet another disadvantage of gas coolers is that condensed water produced can also interfere with accuracy of sensors that are normally placed in the pipe or ducting. Furthermore, condensed water can also interfere with emissions and/or flow measurements that are sometimes required by government regulators. Thus, condensed water gas coolers can cause faulty measurements, equipment malfunction, inaccurate test results, and/or downtime and delays.

In view of the foregoing, there is a demand for a liquid conservation device for emissions treatment systems that use gas coolers without the aforementioned disadvantages.

SUMMARY

In accordance with at least one embodiment, a liquid conservation device that utilizes a gas-to-liquid heat exchanger to condense water vapor from exhaust gas emanating from an emissions treatment system. Water evaporated during the emissions treatment system process is recovered and returned for reuse, thereby significantly reducing the water requirement of the emissions treatment system.

DRAWINGS—FIGURES

The novel features which are characteristic of the present invention are set forth in the appended claims. However, embodiments, together with further objects and attendant advantages, will be best understood by reference to the following detailed description taken in connection with the accompanying drawings in which:

DETAILED DESCRIPTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The details of one or more embodiments of the invention are set forth in the accompanying drawings and the description below. Other features, objects, and advantages of the invention will be apparent from the description and drawings, and from the claims.

Figure 1:
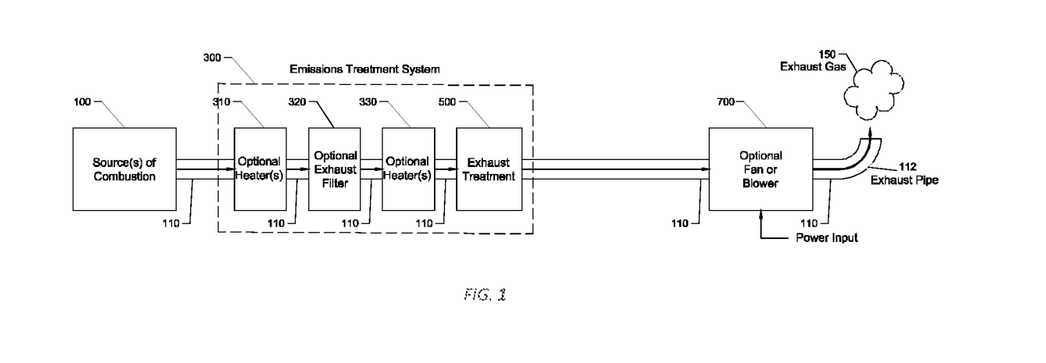
FIG. 1 is a block diagram of a typical example of an emissions treatment system in which multiple independent devices remove pollutants from the engine exhaust.

FIG. 1 is a block diagram that shows an example of a typical emissions treatment system. At least one source of combustion 100, emissions treatment system 300, optional fan or blower 700, and exhaust pipe 112 are connected in series to each other by segments of exhaust pipe or duct 110. Emissions treatment system 300 comprises at least one of the following: heater 310, exhaust filter 320, heater 330, and exhaust treatment 500. The source(s) of combustion 100 may be, among others, one or more internal combustion engines, one or more Diesel engines, and/or one or more boilers. Source(s) of Combustion 100 may consist of any number of sources and/or types of emissions sources and may be combined into a single stream of exhaust gas 150.

Figure 2:
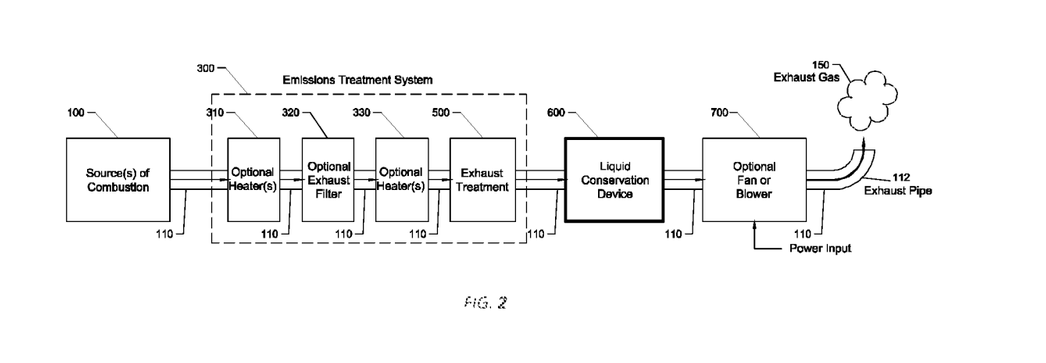
FIG. 2 is a block diagram of an exemplary placement of a liquid conservation device used in conjunction with an exemplary emissions treatment system.
Figure 3:
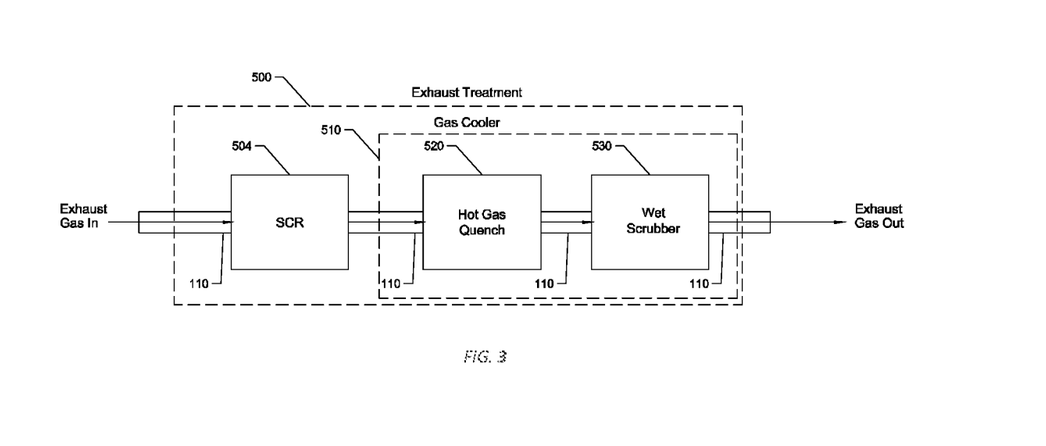
FIG. 3 is a block diagram of a typical example of an exhaust treatment.

FIG. 2 is a block diagram that shows the placement of one exemplary embodiment of the liquid conservation device 600 with respect to the other components of exhaust system. The liquid conservation device 600 is located downstream of the emissions treatment system. This exemplary embodiment includes the following elements of emissions treatment system 300: heater 310, exhaust filter 320 as a Diesel particulate filter (DPF), optional heater 330, and exhaust treatment 500. The contents of exhaust treatment 500 are shown in FIG. 3 below. Exhaust filter 320 typically operates typically between 540° C. to 650° C. This exemplary embodiment also includes optional fan 700 located downstream of exhaust treatment 600, although fan 700 could be located anywhere along the exhaust path.

FIG. 3 shows a block diagram of a typical example of an exhaust treatment 500. Exhaust treatment 500 contains selective catalytic reduction (SCR) 504 and gas cooler 510. Gas cooler 510 contains hot gas quench 520 and wet scrubber 530.

Figure 4:
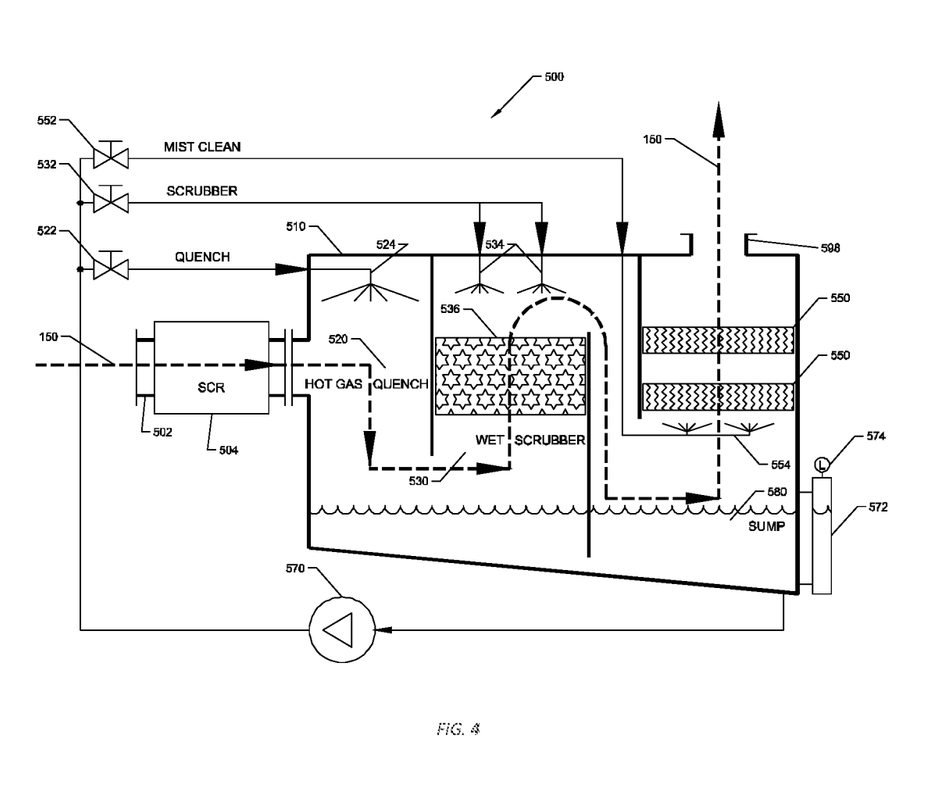
FIG. 4 is a detailed drawing of a typical example of an exhaust treatment.

FIG. 4 shows the details of exhaust treatment 500, comprising of a container with an inlet 502 in series with selective catalytic reduction (SCR) 504, in series with gas cooler 510 in series with outlet 598. Gas cooler 510, in this exemplary embodiment, consists of a hot gas quencher 520 in series with a wet scrubber 530 in series with at least one mist eliminator 550.

The hot gas quencher 520 is a chamber that contains an inlet and an outlet. Hot gas quencher 520 contains at least one quench spray nozzle 524 that is located inside the chamber such that the spray from the nozzle(s) 524 makes contact with nearly all of the exhaust gas that passes through. Hot gas quencher 520 may also be designed such that water coats the walls of the container. The outlet of hot gas quencher 520 is in fluid communication with the inlet of wet scrubber 530.

Wet scrubber 530 is a container that an inlet, an outlet, a bottom end, a middle, and top end. The outlet of hot gas quencher 520 connects to the bottom end of wet scrubber 530. Wet scrubber 530 contains layers of variously-shaped packing media 536 that provide a large surface area for water-particle contact. The packing media is held in place by wire mesh retainers and supported by a structural grid. The structural grid has a high amount of open area to allow gas to pass through. The upper part of wet scrubber 530 contains at least one spray nozzle 534 directed downward toward packing 536 such that the spray makes contact with as much of the packing 536 as possible.

The area downstream of packing 536 is in fluid connection with at least one mist eliminator 550. The mist eliminator in this embodiment is composed of a mesh through which gas moves through freely, but the inertia of the water droplets causes them to contact a surface, coalesce, and ultimately drain as large droplets. Mist eliminator spray nozzles 554 are located under mist eliminator(s) 550 and are directed up so the spray pattern forcibly impacts the nearly all of the bottom of the mist eliminator 550.

The outlet of pump 570 is in fluid connection with quench spray valve 522, scrubber spray valve 532, and mist clean spray valve 552. Quench spray valve 522 is in fluid connection with at least one quench spray nozzle 524. Wet scrubber spray valve 532 is in fluid connection with at least one wet scrubber spray nozzle 534. Mist eliminator spray valve 552 is in fluid connection with at least one mist eliminator spray nozzle 554. The pump 570 is sized so that it is able to deliver enough water flow to supply all three sets of spray nozzles concurrently. Located under hot gas quencher 520, wet chiller 530, and mist eliminator(s) 550 is a sump of sufficient size to hold all of the recirculating water. The inlet of pump 570 is in fluid communication with a low point in sump 580 such that the water in sump 580 will naturally drain to the inlet of pump 570. Level-indicating sight glass 572 consists of a transparent tube with a top fluid connection and a bottom fluid connection. The top fluid connection is located at gas space at the top of sump 580 such that gas may pass between the sump and level indicator 572. The bottom fluid connection is located at a low point in sump 580 such that water may flow freely between sump 580 and level indicator 572. Level sensor 574 is located on level-indicating sight glass 572.

Mist eliminator 550 is in fluid connection to emissions treatment outlet 598.

Figure 5:
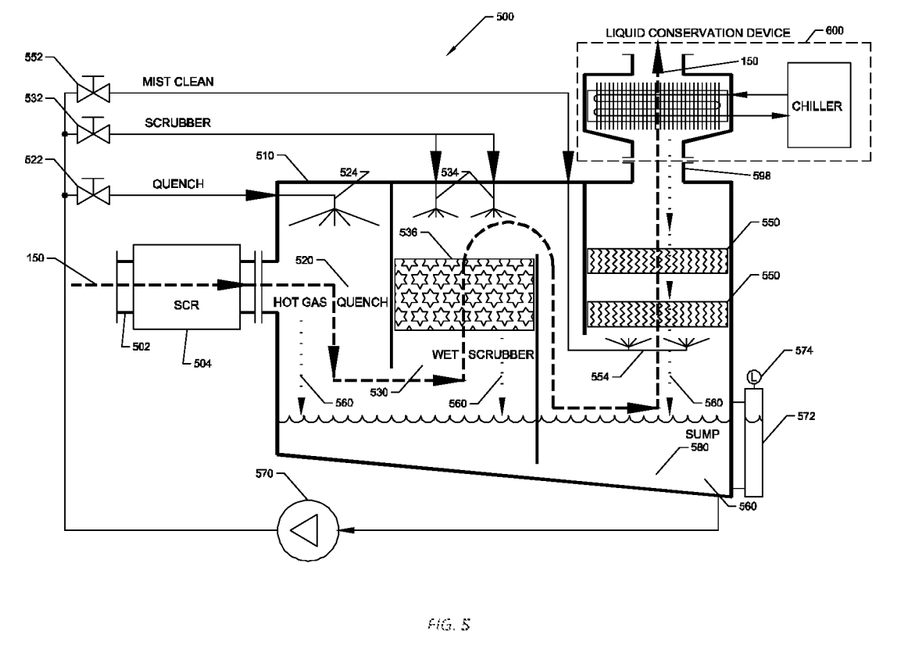
FIG. 5 is a detailed drawing of an exhaust treatment with a liquid conservation device installed.

FIG. 5 shows emissions treatment 500 with liquid conservation device 600 installed to outlet 598. Liquid conservation device 600 is placed in this example such that any water produced is able to drain back into sump 580.

Figure 6:
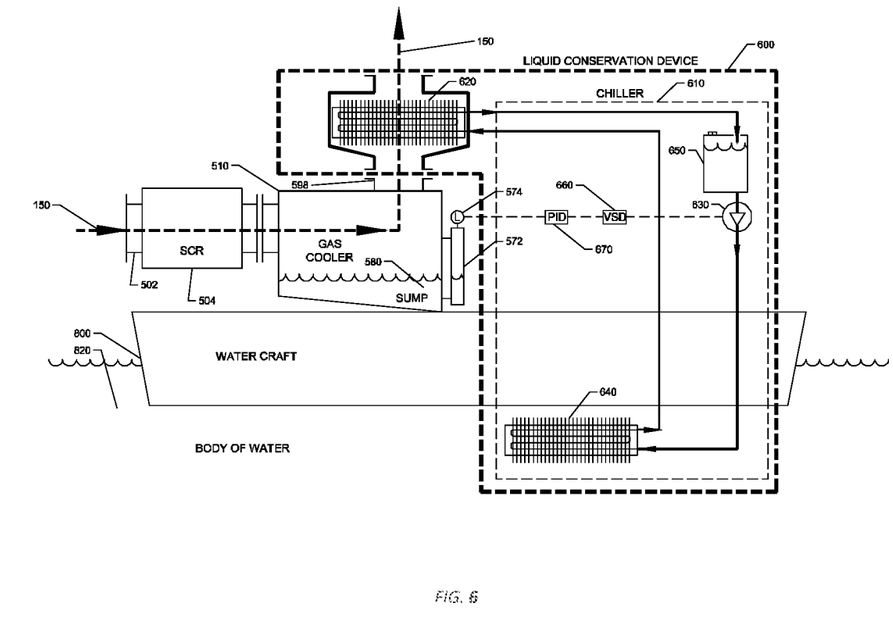
FIG. 6 shows an example of a liquid conservation device as used in an example watercraft application.

FIG. 6 shows an exemplary watercraft application for liquid conservation device 600. Similar systems would apply to mobile land-based systems, systems that travel with vessels, and systems that travel with locomotives, among others. In this example embodiment, an air-to-water heat exchanger 620, otherwise known as a dehumidification coil, is placed so the exhaust gas 150 passes through coil 620 as it exits gas cooler 510. Dehumidification coil 620 is composed of a serpentine metal tube through which coolant flows that makes thermal contact with a series of parallel metal fins. The fins of coil 620 are oriented so to allow exhaust gas flow 150 through them and the fins are spaced so to optimize the rate of condensation of moisture (condensate) on the surface of the fins. The coil is placed so that the condensate from the coil is allowed to ultimately drip back into sump 580 by the force of gravity.

The coolant inlet and outlet of coil 620 are connected to chiller 610. Chiller 610 is composed of reservoir 650, pump 630, heat exchanger 640, dehumidification coil 620, all connected in series. Reservoir 650 is sufficiently large to contain all of the operating coolant in the coolant system. The coolant itself is water or brine, for example. The coolant may contain various additives that are customarily used in coolant systems. Pump 630 is sufficiently sized in to be able to circulate coolant throughout the coolant loop. The entire coolant loop is insulated to prevent moisture from condensing on any of the components. Pump 630 is speed regulated by a connection to variable speed drive (VSD) 660 which connected to proportional-integral-derivative (PID) controller 670. PID controller 670 is connected to level sensor 574, which is mounted on level indicating sight glass 572, which is mounted on the sump tank 580.

Heat exchanger 640 is mounted to water craft 800 so that it is surrounded by the body of water to allow heat transfer with the body of water.

REFERENCE NUMERALS 100 source(s) of combustion
110 exhaust pipe or duct
150 exhaust gas
300 emissions treatment system
310 optional heater
320 exhaust filter
330 optional heater
500 exhaust treatment
502 exhaust treatment inlet
504 selective catalytic reduction (SCR)
510 gas cooler
520 hot gas quencher
522 quench spray valve
524 quench spray nozzle
530 wet scrubber
532 scrubber spray valve
534 scrubber spray nozzles
536 packing media
550 mist eliminator
552 mist clean spray valve
554 mist eliminator nozzles
560 water dripping back into sump
570 recirculation pump
572 level-indicating sight glass
574 level sensor
580 sump
598 exhaust treatment outlet
600 liquid conservation device
610 chiller
620 dehumidification coil
630 coolant pump
640 heat exchanger
650 reservoir
660 variable speed drive 670 PID controller
700 fan/blower
800 watercraft
820 body of water Operation Operation—FIG. 4, Exhaust Treatment Before Installation of Liquid Conservation Device FIG. 4 describes the operation of exhaust treatment 500. Exhaust gas 150 from emissions sources(s) 100 flows into the exhaust treatment 500 via inlet 502. Exhaust gas 100 flows through selective catalytic reduction (SCR) 504. SCR's in general operate at elevated temperatures, typically between 200° C. and 350° C. Downstream processes may require cooling of the exhaust gas 100. In this exemplary embodiment, the temperature of exhaust gas 100 is reduced by gas cooler 510. Gas cooler 510 is composed of hot gas quencher 520 followed by wet scrubber 530. The majority of the temperature reduction occurs in hot gas quencher 520. Hot exhaust gas 150 is quenched, or rapidly cooled by water sprays from spray nozzles 524, or by a combination of water contact and a relative vacuum. The relative vacuum is induced by the shape of the flow path. In this example, the water is water, although other liquids could be used. A significant amount of water is evaporated by the hot exhaust gas 150 which absorbs the heat of the exhaust gas. The gas is saturated with water at this point the gas contains about as much water that it can hold at the associated temperature and pressure. Any water not evaporated is typically recovered and recirculated. The exhaust gas 150 is cooled to near the saturation temperature according to the gas pressure within the hot gas quencher 520. This results in a gas that is saturated with water vapor with a gas temperature that is typically less than 80° C.

The now colder exhaust gas 150 passes from the outlet of the hot gas quencher 520 into the second part of gas cooler 510 which is wet scrubber 530. In this example, the primary purpose of wet scrubber 530 is to remove some of the gaseous pollution from the exhaust gas 150, including but not limited to, sulfur dioxide ($SO_2$). A secondary benefit of wet scrubber 530 is that the exhaust gas 150 is further cooled.

Spray nozzles 524 and 534 produce water droplets, many of which become entrained as mist in exhaust gas 150 and are transported downstream. Exhaust gas 150 exits gas cooler 510 and enters one or more mist eliminator(s) 550. Mist eliminators reduce the amount of entrained water droplets by forcing the gas through a tortuous path such that the inertia of the water droplets causes them to contact a surface, coalesce, and ultimately drain as large droplets away from the exhaust gas 150. Although the exhaust gas 150 is mostly free from water droplets after passing through mist eliminator(s) 550, the gas is still saturated with water vapor. The water collected by mist eliminator(s) 550 returns to sump 580 where it is recycled.

Sump 580 is sufficiently large to contain all the water used in exhaust treatment 500. In this exemplary embodiment the bottom of the sump is slanted to direct the water to the drain at a low point in the sump. Pump 570 draws water from the low point. When pump 570 is running, water is transported throughout the systems various nozzles and packing 536, which reduces the water level in sump 580. Furthermore, water evaporates at a significant rate, which also tends to reduce the water level in sump 580. Sight-glass level indicator 572 allows a visual check of the fluid level in sump 580. In addition, level sensor 574 transmits the water level of sump 580 to a control system. Because level indicator 572 is only connected to sump 580 above and below the surface of the water, the effect of waves and sloshing at the surface is mitigated, so that the level that is measured by level indicator 572 and by level sensor 574 is steady.

Exhaust gas 150 then exits exhaust treatment 500 as water-saturated vapor through outlet 598.

Operation—FIG. 5, Exhaust Treatment with Liquid Conservation Device Installed

FIG. 5 shows liquid conservation device 600 installed on exhaust treatment 500. Before installation of liquid conservation device 600, exhaust gas 150 would exit to the atmosphere as water-saturated vapor. However, after installation of liquid conservation device 600, water is reclaimed from the exhaust gas and recycled.

In this exemplary embodiment of liquid conservation device 600, a liquid-to-air heat exchanger (dehumidification coil) is placed in the exhaust stream. The dehumidification coil is composed of a serpentine metal tube that makes thermal contact with a series of parallel metal fins. Chilled fluid is forced through the coil which causes the fins to become colder than the dewpoint temperature of the gas. This causes condensed moisture (condensate) to form on the surface of the fins. The fins of the coil are oriented to allow exhaust gas flow through them. The coil is constructed and oriented so that the condensate from the coil drips back into sump 580 by the force of gravity.

Sump 580 collects all the excess water from hot gas chiller 520, wet scrubber 530, mist eliminator 550, and liquid conservation device 600. Without liquid conservation device 600, a significant fraction of the circulating water is lost to evaporation. Nearly all of the water that is condensed by liquid conservation device 600 is returned to sump 580, resulting in very little, if any, water usage.

In this exemplary embodiment, the aspect of reduced water usage is very important, especially for mobile exhaust treatments. Since city water is not readily available for a mobile system, either 1) water must be transported to the place of operation or 2) the mobile system has to periodically be brought off-line to move the system to a location where water is available. Thus, reduced water usage therefore results in a system that is less expense, saves energy, increases system availability, and significantly increases the overall treatment efficiency of the exhaust treatment over time.

Operation—FIG. 6, Example of Liquid Conservation Device in a Watercraft Application FIG. 6 shows an exemplary embodiment of liquid conservation device 600 used in conjunction with an exhaust treatment system onboard water craft 800 which operates in body of water 820. In this example, body of water 820 is the ocean, although it could also be a river or a lake. Hot exhaust gas 150 passes through SCR 504. Exhaust gas 150 then passes through gas cooler 510, where the gas is cooled and saturated with water. The water-saturated exhaust gas 150 then enters liquid conservation device 600, where the exhaust gas passes though dehumidification coil 620 before exiting to the atmosphere. As the exhaust gas passes through dehumidification coil 620, much of the water vapor in exhaust gas 150 is condensed out and returned to sump in gas cooler 510.

In this exemplary embodiment of liquid conservation device 600, coolant flows from reservoir 650, to pump 630, to heat exchanger 640, to dehumidification coil 620, and returns to reservoir 650. As the coolant flows through heat exchanger 640, which is submerged in body of water 820, such as the ocean for example, the temperature of the coolant decreases until it approaches the temperature of the body of water. In general, the temperature of body of water 820 is significantly lower than the temperature of the surrounding atmosphere. The now chilled coolant from heat exchanger 640 is then pumped to dehumidification coil 620. As the coolant flows through dehumidification coil 620, it is heated by exhaust gas 150. As a result, the temperature of exhaust gas 150 is reduced such that the water in the exhaust gas condenses onto the coil 620. The most of the condensed water is returned to sump 580.

The speed of pump 630 is controlled by variable speed drive (VSD) 660. The water level in sump 580 of gas cooler 510 is measured by level sensor 574. Proportional-integral-derivative (PID) controller 670 receives the sump level measurement from level sensor 574 and modulates the speed of pump 630 via VSD 660. Furthermore, the coolant flow rate is proportional to the speed of pump 630. Furthermore, the rate at which vapor is condensed on dehumidification coil 620 is directly related to the flow rate of the coolant flowing through it. Therefore, in this example, the water level in sump 580 may be controlled by the speed of pump 630. PID controller 670 is thus programmed in the usual fashion with a reasonable level setpoint. PID controller 670 takes appropriate action to modulate the speed of pump 630 via VSD 660 so that the level setpoint is maintained.

Nearly all of the water that was added to the exhaust gas 150 by the spray solenoids in gas cooler 510 in addition to the vapor that was already present in exhaust gas 150 prior to entering the exhaust treatment is available to be condensed. Sufficient water vapor therefore exists in exhaust gas 150 in order to maintain zero net water usage. Therefore, liquid conservation device 600 is able to remove the necessary amount of water from exhaust gas 150 in order to maintain a constant water level in sump 580.

Operation—FIG. 2

Referring back to FIG. 2 again, with liquid conservation device 600 installed, exhaust gas 150 enters fan 700 with significantly less water vapor, and is not likely to condense inside of exhaust pipe 112 or in fan 700. Furthermore, fan 700 then imparts energy to exhaust gas 150 to increase the temperature further, which makes exhaust gas 150 even less likely to condense. Therefore, as exhaust gas travels through and exits exhaust pipe 112 there is little chance of water forming and little chance of a vapor plume manifesting as exhaust gas 150 exits exhaust pipe 112.

CONCLUSION, RAMIFICATIONS, AND SCOPE

Thus, the reader will see that at least one embodiment of a liquid conservation device that provides the following advantages:

(a) A reduction or elimination of net water usage because the water is recovered by the liquid conservation device. This is especially important in mobile systems that have no direct connection to a water utility. In mobile applications, the water must be stored in a large tank which must be periodically filled. If the mobile system operates apart from a water utility, then water must be transported to the operating location of the mobile system. The result is cost savings and increased availability.

(b) A significant reduction in water use, even to the point of no net water requirement. This advantage for mobile emissions control systems is significant because it significantly reduces the need for on-board water tanks that have to be filled on a regular basis.

(c) Eliminates the need for the mobile system to be required to stop operations and return to a water source before continuing operation.

(d) Reduces the danger that the mobile system will run out of water, which can cause damage to components that rely on the cooling effect of the water.

(e) Eliminates the need for large amounts of water to be transported to the mobile source at great expense.

(f) The elimination of plumes from the exhaust of saturated gas into cold air. This improves the appearance of the exhaust gas as it enters the atmosphere and does not give observers the impression that pollution is being emitted from the exhaust pipe. This helps to improve the reputation of the manufacture and/or operator of the equipment.

(g) The elimination of plumes also increases safety and eliminates visibility issues.

(h) The elimination of moisture in the exhaust system prevents water accumulation in the exhaust pipe and ducting that could lead to blockage or structural failure.

(i) The elimination of moisture that could otherwise lead to corrosion of the exhaust pipes and ducting which could ultimately lead to structural failure.

(j) The elimination of moisture to avoid interference with instrumentation, cause faulty measurements, equipment malfunction, inaccurate test results, inaccurate operational telemetry, and/or downtime and delays.

(k) The elimination of entrained water drops to avoid measurement errors in flow and pressure measurements during emissions testing as required by regulators.

I claim:

1. A method to extract water vapor contained in an exhaust gas emanating from an exhaust treatment including a hot gas quencher utilizing coolant water, the method comprising:
    a. urging said exhaust gas through at least one heat exchanger downstream of said hot gas quencher;
    b. cooling said at least one heat exchanger to maintain the temperature of the heat exchanger to a sufficiently low temperature to produce a water condensate from said water vapor;
    c. providing a means for collecting said water condensate;
    d. returning said water condensate to said exhaust treatment at least for use in said hot gas quencher;
    whereby said water condensate is recovered for continued use in said hot gas quencher.

2. The method of claim 1, wherein said exhaust gas is provided by a diesel engine, an internal combustion engine, a boiler, or other exhaust-producing device located upstream and in fluid communication with said exhaust treatment.

3. The method of claim 1, wherein said exhaust treatment further providing at least one heat source.

4. The method of claim 3, wherein said heat source comprises one or more of the following: a diesel particulate filter, a selective catalytic reduction, and/or at least one heater.

5. The method of claim 1, wherein said exhaust treatment is temporarily connected to and remotely located from a mobile source of the exhaust gas when the mobile source is temporarily not traveling but continuing to generate the exhaust gas, whereas said exhaust treatment is located on a watercraft, an oceangoing vessel, a boat, a barge, land-based platform, a water-based platform, at least one mobile platform, at least one rail car, a locomotive, an automobile, at least one truck, at least one rolling chassis, or at least one mobile platform, or at least one stationary platform.

6. The method of claim 1, wherein said exhaust treatment and source of said exhaust gas reside in the same vehicle, whereas said vehicle comprising a watercraft, an oceangoing vessel, a boat, a barge, at least one rail car, a locomotive, a train, an automobile, a truck, at least one rolling chassis, an aircraft, or at least one mobile platform.

7. The method of claim 1, wherein said heat exchanger is a collection of one or more provided from the group consisting of a liquid-cooled air-to-liquid heat exchanger and a gas-to-gas heat exchanger and a sea water-cooled heat exchanger and a direct expansion heat exchanger and a dehumidification coil and a coil that is cooled by evaporating refrigerant and a gas-to-liquid heat exchanger and a heat pipe heat exchanger and a thermoelectric cooling coil and a suitable gas-cooling device.

8. A liquid conservation device for extracting water contained in an exhaust gas emanating from an exhaust treatment including a hot gas quencher utilizing coolant water, the device comprising:
   a) a container with an inlet and an outlet, said container located downstream of said hot gas quencher;
   b) said container enclosing at least one heat exchanger such that said exhaust gas is caused to pass through said heat exchanger as said exhaust gas passes from said inlet to said outlet;
   c) a means for cooling a portion of said at least one heat exchanger that contacts said exhaust gas to a sufficiently low temperature to produce water condensate from said exhaust gas;
   d) a means for collecting said water condensate from said heat exchanger;
   e) a means for returning said water condensate to said hot gas quencher;
   whereby said water condensate is recovered for use in said hot gas quencher.

9. The device of claim 8, wherein the source of said exhaust gas is a diesel engine, an internal combustion engine, a boiler, or other exhaust-producing device located upstream and in fluid communication with said exhaust treatment.

10. The device of claim 8, wherein said exhaust treatment further comprises at least one heat source.

11. The device of claim 10, wherein said heat source comprises one or more of the following: a diesel particulate filter, a selective catalytic reduction (SCR), and/or at least one heater.

12. The device of claim 8, wherein said exhaust treatment is temporarily connected to and remotely located from a mobile source of the exhaust gas when the mobile source is temporarily not traveling but continuing to generate the exhaust gas, whereas said exhaust treatment is located on a watercraft, an oceangoing vessel, a boat, a barge, land-based platform, a water-based platform, at least one mobile platform, at least one rail car, a locomotive, an automobile, at least one truck, at least one rolling chassis, or at least one mobile platform.

13. The device of claim 8, wherein said exhaust treatment and source of said exhaust gas reside in the same vehicle, whereas said vehicle comprising a watercraft, an oceangoing vessel, a boat, a barge, at least one rail car, a locomotive, a train, an automobile, a truck, at least one rolling chassis, an aircraft, or at least one mobile platform.

14. The device of claim 8, wherein said heat exchanger is a collection of one or more selected from the group consisting of a liquid-cooled air-to-liquid heat exchanger and a gas-to-gas heat exchanger and a sea water-cooled heat exchanger and a direct expansion heat exchanger and a dehumidification coil and a coil that is cooled by evaporating refrigerant and a gas-to-liquid heat exchanger and a heat pipe heat exchanger and a thermoelectric cooling coil and a suitable gas-cooling device.

15. A liquid conservation device for the extraction of water contained in an exhaust gas stream emanating from an exhaust treatment including a hot gas quencher utilizing coolant water, the device comprising:
   a) a container with an inlet and an outlet, said container located downstream of said hot gas quencher;
   b) a heat exchanger in liquid communication between said inlet and said outlet;
   c) a surface of said heat exchanger that is in fluid contact with said exhaust gas set to a sufficiently low temperature to produce water condensate from said exhaust gas;
   d) a collector in fluid communication with said water condensate from said heat exchanger oriented to facilitate the extraction of said water condensate;
   e) a conduit in fluid communication with said collector for returning said water condensate to said exhaust treatment;
   whereby said water condensate is recovered for use in at least said hot gas quencher.

16. The device of claim 15, wherein the source of said exhaust gas is a diesel engine, an internal combustion engine, a boiler, or other exhaust-producing device located upstream and in fluid communication with said exhaust treatment.

17. The device of claim 15, wherein said exhaust treatment further comprises at least one heat source.

18. The device of claim 15, wherein said heat exchanger is a collection of one or more selected from the group consisting of a liquid-cooled air-to-liquid heat exchanger and a gas-to-gas heat exchanger and a sea water-cooled heat exchanger and a direct expansion heat exchanger and a dehumidification coil and a coil that is cooled by evaporating refrigerant and a gas-to-liquid heat exchanger and a heat pipe heat exchanger and a thermoelectric cooling coil and a suitable gas-cooling device.

19. The device of claim 15, wherein said exhaust treatment is temporarily connected to and remotely located from a mobile source of the exhaust gas when the mobile source is temporarily not traveling but continuing to generate the exhaust gas, whereas said exhaust treatment is located on a watercraft, an oceangoing vessel, a boat, a barge, land-based platform, a water-based platform, at least one mobile platform, at least one rail car, a locomotive, an automobile, at least one truck, at least one rolling chassis, or at least one mobile platform.

20. The device of claim 15, wherein said exhaust treatment and source of said exhaust gas reside in the same vehicle, whereas said vehicle comprising a watercraft, an oceangoing vessel, a boat, a barge, at least one rail car, a locomotive, a train, an automobile, a truck, at least one rolling chassis, an aircraft, or at least one mobile platform.

* * * * *